(12) United States Patent
Harris et al.

(10) Patent No.: US 7,929,651 B1
(45) Date of Patent: Apr. 19, 2011

(54) LOW PHASE NOISE RECURSIVE DIRECT DIGITAL SYNTHESIS WITH AUTOMATIC GAIN CONTROL GAIN STABILIZATION

(75) Inventors: Frederic J. Harris, San Diego, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 787 days.

(21) Appl. No.: 11/983,587

(22) Filed: Nov. 9, 2007

(51) Int. Cl.
  *H04L 27/08* (2006.01)
(52) U.S. Cl. ....... 375/345; 455/76; 455/245.1; 327/105; 708/271
(58) Field of Classification Search .................. 375/345, 375/377; 327/105; 455/76, 165.1, 183.1, 455/260, 234.1, 245.1; 708/271
See application file for complete search history.

(56) References Cited

U.S. PATENT DOCUMENTS

| | | | | |
|---|---|---|---|---|
| 5,737,253 | A * | 4/1998 | Madisetti et al. | 708/276 |
| 6,347,325 | B1 * | 2/2002 | Ribner et al. | 708/271 |
| 6,693,970 | B2 * | 2/2004 | Vankka | 375/261 |
| 6,999,537 | B2 * | 2/2006 | Shippee | 375/346 |
| 7,020,190 | B2 * | 3/2006 | Sullivan | 375/222 |
| 7,327,783 | B2 * | 2/2008 | Sullivan | 375/222 |
| 2004/0082302 | A1 * | 4/2004 | Shippee | 455/127.1 |
| 2005/0176394 | A1 * | 8/2005 | Inogai | 455/234.1 |
| 2006/0282489 | A1 * | 12/2006 | Khan et al. | 708/422 |
| 2008/0013654 | A1 * | 1/2008 | Rick et al. | 375/345 |

OTHER PUBLICATIONS

Harris, Frederic J. et al. "Ultra Low Phase Noise DDS", Nov. 13, 2007, 6 pages, available from Xilinx, Inc., 2100 Logic Drive, San Jose, CA 95124.
Dick, Chris et al., "Synchronization in Software Defined Radios—Carrier and Timing Recovery Using FPGAs," *Proc. of the IEEE Symposium on Field-Programmable Custom Computing Machines*, Apr. 16, 2000, pp. 195-204, IEEE Computer Society, Washington, DC, USA.
Harris, Fred et al., "Error Feedback Loop Linearizes Direct Digital Synthesizers " *Proc. of the 29$^{th}$ Asilomar Conference on Signals, Systems and Computers*, Oct. 30, 1995, pp. 98-102, IEEE Computer Society, Washington, DC, USA.
Harris, Fred, "A Novel Approach to the Designs of Optimal Second Order Digital Filters," *Proc. of Southcon-82*, Mar. 1982, pp. 1-7.
Mitra, Sanjit K., *Digital Signal Processing*, Second Edition, 2001, Chapter 8, pp. 515-582, McGraw Hill, New York, New York, USA.
Valls, J. et al., "The Use of CORDIC in Software Defined Radios: A Tutorial," *IEEE Communications Magazine*, Sep. 2006, pp. 46-50, vol. 44, No. 9, IEEE Communications Society, New York, New York, USA.

* cited by examiner

*Primary Examiner* — Jean B Corrielus
(74) *Attorney, Agent, or Firm* — Kevin T. Cuenot; Lois D. Cartier

(57) ABSTRACT

Disclosed is a recursive, direct digital synthesizer includes an accumulator module and a Coordinate Rotation Digital Computer (CORDIC) module coupled to the accumulator module. The CORDIC module rotates a signal according to a desired rotation angle specified by the accumulator module. An automatic gain control module is coupled to the CORDIC module. The automatic gain control module can apply a level of gain to the rotated signal.

20 Claims, 1 Drawing Sheet

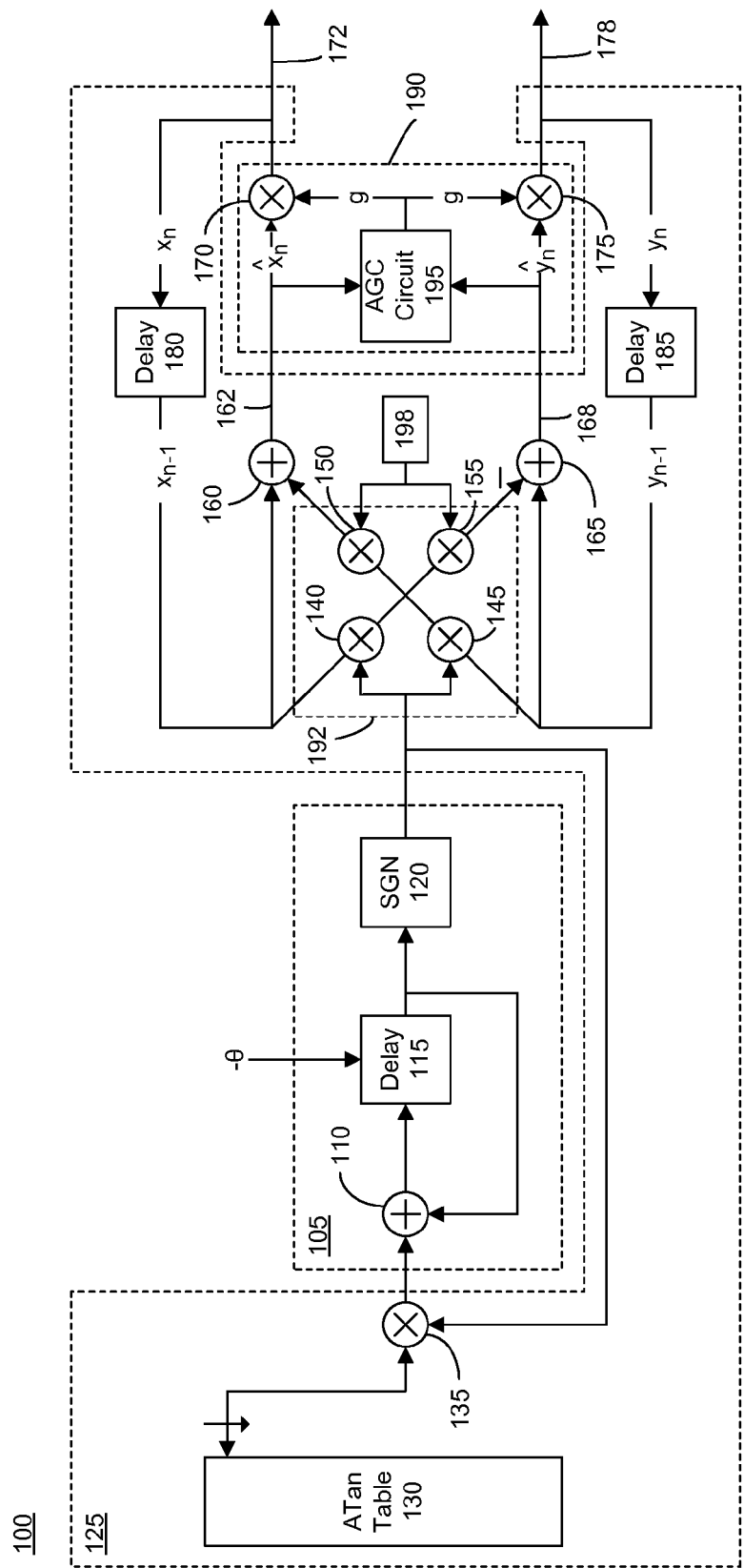

LOW PHASE NOISE RECURSIVE DIRECT DIGITAL SYNTHESIS WITH AUTOMATIC GAIN CONTROL GAIN STABILIZATION

FIELD OF THE INVENTION

The embodiments disclosed herein relate to the creation of high quality sinusoidal signals within digital environments. More particularly, the embodiments relate to direct digital synthesis.

BACKGROUND OF THE INVENTION

Many digital signal processing (DSP) functions, such as those found within communication systems, require the generation of a high-quality sinusoidal signal. A "high quality sinusoidal signal" or "high quality sinusoid," as used herein, can refer to a sinusoidal signal that is spectrally pure, e.g., one with harmonics, or spurs, lower than a predetermined threshold with respect to the primary or carrier frequency. For example, a high quality sinusoid may have harmonic levels that are at least 60 dB below that of the primary frequency.

Examples of DSP functions that rely upon sinusoids can include, but are not limited to, discrete Fourier transform (DFT) functions, fast Fourier transform (FFT) functions, digital up converters, digital down converters, carrier recovery loops, and the like. Within digital up or digital down converters, for instance, the sinusoid is used as the local oscillator which drives the DSP function.

One technique for generating a high quality sinusoid involves storing sinusoid samples in a lookup table. A time-varying phase argument is generated using an overflow accumulator. The value obtained for the angle at a given point in time is used to index into the lookup table. Sample values can be read out of the lookup table according to the angle generated from the overflow accumulator over time to generate the sinusoid. A significant number of samples must be stored to generate a high quality sinusoid, e.g., one with low phase noise on the order of approximately greater than −120 dB. For example, in the typical case, the lookup table must be large enough to store several million samples. Storing such a large amount of data can be problematic for systems implemented within smaller devices, e.g., integrated circuits, where memory resources are limited.

Another technique for generating a high quality sinusoid is to utilize a recursive filter structure. While such structures do not require significant memory to store sinusoid samples, recursive filter structures suffer from stability issues. It is not theoretically possible to determine filter values, e.g. poles, which result in a stable system without an external amplitude stabilizing, (automatic gain control, AGC). AGC requires a high level of numerical accuracy which in real world systems is not easily accomplished.

SUMMARY OF THE INVENTION

The embodiments disclosed herein relate to direct digital synthesis (DDS) for the creation of high quality sinusoidal signals. One embodiment of the present invention can include a recursive DDS system including an accumulator module, a Coordinate Rotation Digital Computer (CORDIC) module coupled to the accumulator module, and an automatic gain control (AGC) module coupled to the CORDIC module. The CORDIC module can rotate a signal according to a desired rotation angle specified by the accumulator module. The AGC module can apply a level of gain to the rotated signal.

The accumulator module can include a sign bit removal (SGN) module that can determine a sign from a signal. The AGC module can dynamically control the level of gain applied to the rotated signal output from the CORDIC module. For example, the AGC module can adjust the level of gain according, at least in part, to an amplitude error and a pole position error.

The AGC module can include an AGC circuit receiving a first output signal and a second output signal of the CORDIC module. The AGC module can include a first multiplier receiving the first output signal of the CORDIC module and multiplying the first output signal according to the level of gain, as well as a second multiplier receiving the second output signal of the CORDIC module and multiplying the second output signal according to the level of gain. The level of gain, denoted as g, can be determined according to $$g = \frac{3 - [\hat{x}^2(n) + \hat{y}^2(n)]}{2},$$

wherein [$\hat{x}(n)$, $\hat{y}(n)$] represents the rotated signal.

The CORDIC module can include a butterfly structure receiving a butterfly error value. The butterfly error value can be initially set to $2^{-k}$, where k represents a number of rotations performed by the CORDIC module. The butterfly error value can be changed to a remainder angle of the accumulator module after a predetermined number of iterations of the CORDIC module.

Another embodiment of the present invention can include a programmable logic device including a recursive DDS. The recursive DDS can include an accumulator module, a CORDIC module coupled to the accumulator module, and an AGC module coupled to the CORDIC module. The CORDIC module can rotate a signal according to a desired rotation angle specified by the accumulator module. The automatic gain control module can apply a level of gain to the rotated signal. The recursive DDS can be implemented using programmable logic.

Yet another embodiment of the present invention can include a computer program product including a computer-usable medium having computer-usable program code that, when executed by an information processing system, can implement the structures disclosed herein within an integrated circuit.

BRIEF DESCRIPTION OF THE DRAWINGS

The FIGURE is a block diagram illustrating a recursive, direct digital synthesis system in accordance with one embodiment of the present invention.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to direct digital synthesis (DDS) for the creation of high quality sinusoidal signals. More particularly, the embodiments relate to a stabilized, recursive DDS architecture. An automatic gain control (AGC) module can be utilized with a recursive filter structure, e.g., a recursive Coordinate Rotation Digital Computer (CORDIC) structure. The AGC module can dynamically adjust gain, e.g., increase, decrease, or provide unity gain, to the recursive DDS system output. Accordingly, a high quality sinusoid can be generated without the need for a large lookup table for storing sinusoid samples and without the stability issues typically found with conventional DDS implementations that utilize recursive filter structures.

The FIGURE is a block diagram illustrating a recursive, DDS system (system) 100 in accordance with one embodiment of the present invention. The system 100 can produce a high quality sinusoidal signal of a specified frequency. As shown, the system 100 can include an accumulator module 105, a CORDIC module 125, and an AGC module 190.

The accumulator module 105 can be implemented as a phase accumulator. The accumulator module 105 can include an adder 110, a delay 115, as well as a sign bit removal (SGN) module 120. The adder 110 can receive an input signal from a multiplier 135 which is part of the CORDIC module 125 to be described herein in greater detail. The adder 110 can receive a feedback signal taken from the output of delay 115 and add the feedback signal with the signal received from the multiplier 135. The delay 115 can receive the signal output from the adder 110 and delay the signal by one sample. The output from the delay 115 can be provided to the SGN module 120. The SGN module 120 can extract the sign bit from the signal received from delay 115, e.g., the current value within the accumulator module 105, and provide an output signal specifying the sign bit to the CORDIC module 125.

The CORDIC module 125 can convert the phase output from the accumulator module 105 into a complex sinusoidal signal. The CORDIC module 125 can perform vector rotation where a signal denoted as [x(n−1), y(n−1)] can be rotated through an angle θ yielding a rotated vector [x̂(n), ŷ(n)]. The CORDIC module 125 can implement the vector rotation as a sequence of successively smaller rotations, each of angle $\arctan(2^{-k})$, where k indicates the number of rotations to be performed. The CORDIC module 125 can be implemented as a recursive structure including multiple feedback paths. As shown, the CORDIC module 125 can include an arctangent (atan) table 130, a butterfly structure 192, a plurality of delays 180 and 185, and a plurality of adders 160 and 165.

The atan table 130 can store a plurality of values of arctan $(2^k)$, where k represents the number of rotations performed by the CORDIC module 125. The atan table 130 can provide a value selected from the table as output to the multiplier 135. The multiplier 135 can multiply the value obtained from the atan table 130 with a feedback signal that can be taken from the output of the accumulator module 105, and more particularly, from the SGN module 120.

The output signal from the SGN module 120 can be provided to the butterfly structure 192 of the CORDIC module 125. The butterfly structure 192 can include the multipliers 140, 145, 150, and 155. The output signal from the SGN module 120 can be split and provided to each of multipliers 140 and 145. Multiplier 140 can multiply the signal from the SGN module 120 with a feedback signal that is output from the delay 180. The delay 180 can delay the signal $x_n$ by one sample to output signal $x_{n-1}$, where n indicates a particular sample and, thus, a reference to a particular time. The signal that is output from multiplier 140 can be provided to multiplier 155, which can multiply the received signal with a butterfly error value 198. The signal that is output from multiplier 155 can be provided to adder 165. Adder 165 can add the received signal with a feedback signal taken from the delay 185 to produce an output signal 168, e.g., $ŷ_n$. The delay 185 can delay the signal $y_n$ by one sample to produce an output signal $y_{n-1}$.

Similarly, the multiplier 145 can multiply the signal from SGN 120 with a feedback signal that is output from delay 185 ($y_{n-1}$). The output signal from multiplier 145 can be provided to multiplier 150, which can multiply the received signal with the butterfly error value 198. The signal that is output from multiplier 150 can be provided to adder 160. Adder 160 can add the received signal with the feedback signal taken from delay 180 ($x_{n-1}$) to produce an output signal 162, e.g., $x̂_n$.

The CORDIC module 125 implements a recursive filter structure. To achieve stability, the pole of a recursive filter must be located on the unit circle or within the unit circle. As is known, a pole located within the unit circle results in a sinusoid of decreasing amplitude. A pole located outside the unit circle produces a sinusoid of increasing amplitude. In either case, the amplitude of the complex sinusoid is, for each sample value, corrected back to unity by the AGC module. A theoretical value for a pole, which is a transcendental number, can be calculated such that the pole will be located on the unit circle. Since the value of the pole is calculated in a digital system using finite precision numbers, the resulting value for the pole will not place the pole precisely upon the unit circle. As the CORDIC module 125 iterates, the pole will likely migrate to locations within the unit circle, on the unit circle, and/or beyond the unit circle.

Within a conventional recursive DDS having a CORDIC module, signals 162 and 168 typically are provided as output after being modified by a $\cos(\theta_k)$ multiplication operation. The $\cos(\theta_k)$ multiplication operation serves to correct an amplitude error introduced into the system as a consequence of phase correction. The AGC module 190 can be positioned to process the output from the CORDIC module 125. More particularly, the AGC module 190 can receive signal 162 and signal 168. The AGC module 190 can dynamically adjust the amount of gain applied to each of signals 162 and 168 to generate signal 172, e.g., $x_n$, and signal 178, e.g., $y_n$, respectively.

The gain applied by the AGC module 190 can continually compensate for the pole value(s) being located off of the unit circle. Due to the inclusion of the AGC module 190, the module that calculates the $\cos(\theta_k)$ multiplication operation typically included within a recursive CORDIC module can be eliminated. The AGC module 190 can be configured to provide an amount of gain that accounts for the removed $\cos(\theta_k)$ multiplication operation as well as for pole compensation.

The AGC module 190 can include an AGC circuit 195 which can receive rotated signals 162 and 168. The AGC module 190 further can include multipliers 170 and 175. The AGC circuit 195 can, responsive to receiving signals 162 and 168, provide a gain signal to each of multipliers 170 and 175. Accordingly, the CORDIC module 125 can output signal 172 from multiplier 170 which is signal 162 adjusted according to the gain signal from the AGC circuit 195. The CORDIC module 125 further can output a signal 178 from multiplier 175 which is signal 168 adjusted by the gain signal from the AGC circuit 195.

In general, input samples [x(n−1), y(n−1)] can be rotated by the CORDIC module 125 to produce rotated sample[x̂(n), ŷ(n)]. The 2-tuple [x̂(n), ŷ(n)] can be further processed by the AGC module 190 to produce gain corrected output sample [x(n), y(n)]. In operation, the delay 115 can be initialized with a value corresponding to −θ, where θ represents the desired rotation angle of the CORDIC module 125. The CORDIC module 125 can perform a selected number of iterations, e.g., "k+1." For purposes of illustration, the CORDIC module 125 can perform 10 binary shifts and additions of the ordered pair [x(n−1), y(n−1)], though any desired number of iterations can be performed. The CORDIC module 125 can iterate while trying to zero the content of the accumulator module 105, e.g., the value loaded into delay 115, by adding or subtracting selected angles stored in the atan table 130. The butterfly error value 198 initially can be set to $2^{-k}$.

In one embodiment, the gain, denoted as g, of the AGC module 190 can be set to a value of 1 for the first "k" iterations, e.g., 9 iterations. At iteration k+1, e.g., iteration 10, the gain can be set to a value of 1/1.646759. The product of the cosine scale factors can be applied once at the end of the rotation cycle rather than one time per rotation. After iteration k+1, a non-zero residual angle $\theta_{REM}$ will remain in the accumulator module 105, e.g., the delay 115. One additional rotation can be performed by replacing the butterfly error value 198 of $2^{-k}$ with the residual angle $\theta_{REM}$ from the accumulator module 105.

Amplitude correction can be performed via the AGC module 190. In determining the level of gain to be applied, it can be assumed that the rotation process results in an unknown amplitude increase ε relative to 1. This relationship can be expressed as: $\hat{x}^2(n)+\hat{y}^2(n)=\{1+\epsilon\}$, where x̂ represents the real portion and ŷ represents the imaginary portion of the vector [x̂, ŷ]. It should be appreciated that signals 162 and 168, taken collectively, define the vector [x̂, ŷ], where signal 162 corresponds to the real (x̂) portion and signal 168 corresponds to the imaginary (ŷ) portion.

The gain of the AGC module 190 can be applied to the output signals 162 and 168 which specify the final rotation to obtain gain adjusted final rotation signals 172 and 178 corresponding to [x(n), y(n)]. Applying the gain g to the above relationship provides: $[\hat{x}^2(n)+\hat{y}^2(n)]g^2=\{1+\epsilon\}g^2=1$. Solving for g, the relationships listed below can be determined.

$$g^2 = \frac{1}{\{1+\varepsilon\}}$$

$$g = \frac{1}{\sqrt{1+\varepsilon}} \cong \frac{1}{1+\frac{\varepsilon}{2}} \cong 1 - \frac{\varepsilon}{2}$$

Solving for ε using the above equations, the relationships listed below can be determined.

$$\epsilon = [\hat{x}^2(n)+\hat{y}^2(n)]-1$$

$$g = 1 - \frac{\varepsilon}{2} = 1 - \frac{[\hat{x}^2(n)+\hat{y}^2(n)]-1}{2}$$

$$g = 3 - \frac{[\hat{x}^2(n)+\hat{y}^2(n)]}{2}$$

The AGC module 190 can apply gain signals having a level of gain g that can be calculated as shown above. The gain g can be applied to the output of the tan rotate and angle correction rotate to correct the amplitude error caused by the phase correction as well the amplitude increase or decrease due to the pole position error relative to the unit circle. Signals 172 and 178 output from the AGC module 190 define the resulting high quality sinusoidal signal from system 100.

In one embodiment, for a fixed frequency sinusoid, the accumulator module 105 can be initialized with the same angle value for each successive time sample. Thus, the sequence of add-subtract iterations in the CORDIC module 125 can be identical for each computed trig sample. The memory of the CORDIC module 125 effectively resides in the filter states rather than in a traditional phase accumulator which forms and presents a sequence of phase angles modulo 2π to a CORDIC servo accumulator. Thus, the phase sequence is a constant for the recursive CORDIC module 125. For example, the same angle error will always reside in the accumulator module 105.

In consequence, there is no line structure in the spectrum of the recursive CORDIC structure disclosed herein. Further, the phase error correction is not applied to suppress phase error artifacts, but rather to complete the phase rotation left incomplete due to the residual phase term in the accumulator module 105.

Quantizers between the summing junction feeding the CORDIC registers and the registers are included. The truncation circulates in the registers and contributes a DC term thereby causing a spectral line for the complex sinusoid. This DC term can be suppressed by using a sigma delta feedback loop to feedback the truncated segments of the sums.

The embodiments disclosed herein can be implemented as a plurality of discrete components or within an integrated circuit. In one embodiment, for example, the embodiments can be implemented within a programmable logic device such as a field programmable gate array. The circuit structures disclosed herein can be implemented using programmable logic of the programmable logic device or field programmable gate array as the case may be. It should be appreciated, however, that the embodiments disclosed herein are not intended to be limited to any one type of device for implementation.

In another embodiment, the system disclosed herein can be specified in programmatic form. For example, the system can be implemented as a predeveloped block known as a macro. The macro may exist within a macro library available within or included as part of an electronic design automation (EDA) tool. The macro may be specified as a netlist, using a hardware description language, or in other computer-readable form. The macro, when incorporated into a circuit design, can be processed by the EDA tool and transformed into a bitstream. The bitstream, when loaded into a target PLD, can configure the target device to implement the structures described herein.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein or configure logic that implements the various circuit structures disclosed herein. Examples of computer-usable or computer-readable media can include, but are not limited to, optical media, magnetic media, magneto-optical media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a bitstream, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A recursive, direct digital synthesizer comprising:
   an accumulator module;
   a Coordinate Rotation Digital Computer (CORDIC) module coupled to the accumulator module, wherein the CORDIC module comprises circuitry that rotates a signal according to a desired rotation angle specified by the accumulator module; and
   an automatic gain control module coupled to the CORDIC module, wherein the automatic gain control module applies a level of gain to the rotated signal according, at least in part, to a pole position error.

2. The recursive, direct digital synthesizer of claim 1, wherein the accumulator module comprises a sign bit removal module determining a sign from the signal.

3. The recursive, direct digital synthesizer of claim 1, wherein the automatic gain control module dynamically controls the level of gain applied to the rotated signal.

4. The recursive, direct digital synthesizer of claim 1, wherein the automatic gain control module adjusts the level of gain according, at least in part, to an amplitude error caused by phase correction.

5. The recursive, direct digital synthesizer of claim 1, wherein the automatic gain control module further comprises:
   an automatic gain control circuit receiving a first output signal and a second output signal of the CORDIC module;
   a first multiplier receiving the first output signal of the CORDIC module and multiplying the first output signal according to the level of gain; and
   a second multiplier receiving the second output signal of the CORDIC module and multiplying the second output signal according to the level of gain.

6. The recursive, direct digital synthesizer of claim 1, wherein the level of gain, denoted as g, is determined according to $$g = \frac{3 - [\hat{x}^2(n) + \hat{y}^2(n)]}{2},$$

wherein [$\hat{x}(n)$, $\hat{y}(n)$] represents the rotated signal.

7. The recursive, direct digital synthesizer of claim 1, wherein the CORDIC module further comprises a butterfly structure receiving a butterfly error value, wherein the butterfly error value is initially set to $2^{-k}$ and is changed to a remainder angle of the accumulator module after a predetermined number of iterations of the CORDIC module.

8. An integrated circuit, comprising:
   a recursive, direct digital synthesizer comprising:
      an accumulator module;
      a Coordinate Rotation Digital Computer (CORDIC) module coupled to the accumulator module, wherein the CORDIC module comprises circuitry that rotates a signal according to a desired rotation angle specified by the accumulator module; and
      an automatic gain control module coupled to the CORDIC module, wherein the automatic gain control module applies a level of gain to the rotated signal according, at least in part, to a pole position error.

9. The integrated circuit of claim 8, wherein the recursive, direct digital synthesizer is implemented using programmable logic.

10. The integrated circuit of claim 8, wherein the automatic gain control module dynamically controls the level of gain according, at least in part, to an amplitude error.

11. The integrated circuit of claim 8, wherein the automatic gain control module further comprises:
   an automatic gain control circuit receiving a first output signal and a second output signal of the CORDIC module;
   a first multiplier receiving the first output signal of the CORDIC module and multiplying the first output signal according to the level of gain; and
   a second multiplier receiving the second output signal of the CORDIC module and multiplying the second output signal according to the level of gain.

12. The integrated circuit of claim 8, wherein the level of gain, denoted as g, is determined according to $$g = \frac{3 - [\hat{x}^2(n) + \hat{y}^2(n)]}{2},$$

wherein [$\hat{x}(n)$, $\hat{y}(n)$] represents the rotated signal.

13. The integrated circuit of claim 8, wherein the CORDIC module further comprises a butterfly structure receiving a butterfly error value, wherein the butterfly error value is initially set to $2^{-k}$ and is changed to a remainder angle of the accumulator module after a predetermined number of iterations of the CORDIC module.

14. A non-transitory computer-readable medium having computer-usable instructions recorded thereon for implementing a method of implementing a recursive, direct digital, synthesizer in an integrated circuit, the method comprising:

implementing an accumulator module;

implementing a Coordinate Rotation Digital Computer (CORDIC) module coupled to the accumulator module, wherein the CORDIC module rotates a signal according to a desired rotation angle specified by the accumulator module; and implementing an automatic gain control module coupled to the CORDIC module, wherein the automatic gain control module applies a level of gain to the rotated signal according, at least in part, to a pole position error.

15. The computer-readable medium of claim 14, wherein implementing the accumulator module comprises implementing a sign bit removal module that determines a sign from the signal.

16. The computer-readable medium of claim 14, wherein the computer-usable program code that implements the automatic gain control module further comprises computer-usable program code that causes the automatic gain control module to dynamically control the level of gain applied to the rotated signal.

17. The computer-readable medium of claim 14, wherein implementing the automatic gain control module further comprises implementing computer-usable program code that adjusts the level of gain according, at least in part, to an amplitude error.

18. The computer-readable medium of claim 14, wherein the implementing the automatic gain control module further comprises:

implementing an automatic gain control circuit that receives a first output signal and a second output signal of the CORDIC module;

implementing a first multiplier receiving the first output signal of the CORDIC module and multiplying the first output signal according to the level of gain; and implementing a second multiplier receiving the second output signal of the CORDIC module and multiplying the second output signal according to the level of gain.

19. The computer-readable medium of claim 14, wherein implementing the automatic gain control module further comprises implementing computer-usable program code that defines the level of gain, denoted as g, according to $$g = \frac{3 - [\hat{x}^2(n) + \hat{y}^2(n)]}{2},$$

wherein $[\hat{x}(n), \hat{y}(n)]$ represents the rotated signal.

20. The computer-readable medium of claim 14, wherein implementing the CORDIC module further comprises implementing a butterfly structure for receiving a butterfly error value, wherein the butterfly error value is initially set to $2^{-k}$ and is changed to a remainder angle of the accumulator module after a predetermined number of iterations of the CORDIC module.

* * * * *